US006813941B2

(12) United States Patent
Beuther et al.

(10) Patent No.: US 6,813,941 B2
(45) Date of Patent: Nov. 9, 2004

(54) METHOD TO MEASURE TENSION IN A MOVING WEB AND TO CONTROL PROPERTIES OF THE WEB

(75) Inventors: Paul D. Beuther, Neenah, WI (US); Amy Christina Seewoester, Columbia, MO (US); Robert Paul Guarnotta, Evans, GA (US); Bryan Robert Moore, Augusta, GA (US); Philip Sim Lin, Oshkosh, WI (US); Kevin J. Mullally, Neenah, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 183 days.

(21) Appl. No.: 10/027,243

(22) Filed: Dec. 20, 2001

(65) Prior Publication Data

US 2003/0115946 A1 Jun. 26, 2003

(51) Int. Cl.[7] ................................................. G01L 5/04
(52) U.S. Cl. ....................................................... 73/159
(58) Field of Search ......................... 73/579, 655, 671, 73/159

(56) References Cited

U.S. PATENT DOCUMENTS

| 3,854,329 A | 12/1974 | Jones |
| 3,861,207 A | 1/1975 | Barbee |

(List continued on next page.)

FOREIGN PATENT DOCUMENTS

| EP | 0192697 B1 | 9/1988 |
| EP | 0582947 B1 | 11/1996 |
| WO | WO 9944014 | 9/1999 |
| WO | WO 0002027 | 1/2000 |
| WO | WO 0026628 | 5/2000 |

OTHER PUBLICATIONS

Tenscan Brochure (8 pages), Unknown Date.
Technical Research Center of Finland Brochure (4 pages), Unknown Date.
Technical Research Center of Finland Brochure (2 pages), Unknown Date.
Technical Paper from Eucepa Symposium (14 pages), Oct. 1992.
C.D. Mote, "Dynamic Stability of Axially Moving Materials", Shock and Vibration Digest, vol. 4, No. 4, pp 4–11, Apr. 1972.
N.C. Perkins, Linear Dynamics of a Translating String on an Elastic Foundation:, Journal of Vibration and Acoustics, vol. 112, pp 2–7, Jan. 1990.
U.S. Patent Application KCX–448B, Ser. No. 10/027,244, Filed Dec. 20, 2001.

*Primary Examiner*—Edward Lefkowitz
*Assistant Examiner*—Lilybett Martir
(74) *Attorney, Agent, or Firm*—Dority & Manning, P.A.

(57) ABSTRACT

A process for determining the tension in a moving web is provided. The process includes the step of providing a web that is moving at a determined speed. The speed has a determined basis weight. A wave is created in the moving web. The speed of the propagation of the wave is determined. Also, the tension on the moving web is determined through a mathematical relationship between the wave speed, the basis weight of the web, and the speed of the web. The instability index of the web is greater than or equal to 0.5.

12 Claims, 12 Drawing Sheets

U.S. PATENT DOCUMENTS

| | | |
|---|---|---|
| 4,235,102 A | 11/1980 | Karlsson et al. |
| 4,309,618 A | 1/1982 | Carter, Jr. et al. |
| 4,335,603 A | 6/1982 | Locke |
| 4,376,368 A | 3/1983 | Wilson |
| 4,496,428 A | 1/1985 | Wells |
| 4,501,642 A | 2/1985 | Wells |
| 4,637,727 A | 1/1987 | Ahola et al. |
| 4,655,093 A | 4/1987 | Strom et al. |
| 4,789,820 A | 12/1988 | Parrent, Jr. et al. |
| 4,833,928 A * | 5/1989 | Luukkala et al. ...... 73/862.391 |
| 4,936,141 A | 6/1990 | Anderson, Jr. et al. |
| 4,992,142 A | 2/1991 | Nguyen |
| 5,025,665 A | 6/1991 | Keyes, IV et al. |
| 5,047,640 A | 9/1991 | Brunnschweiler et al. |
| 5,052,233 A | 10/1991 | Rantala |
| 5,066,865 A | 11/1991 | Wennerberg |
| 5,073,714 A | 12/1991 | Nguyen |
| 5,113,708 A | 5/1992 | Bode et al. |
| 5,129,988 A | 7/1992 | Farrington, Jr. |
| 5,228,893 A | 7/1993 | Smithgall et al. |
| 5,251,491 A | 10/1993 | Nakaoka et al. |
| 5,357,812 A | 10/1994 | Kubert et al. |
| 5,361,638 A | 11/1994 | Pettersson et al. |
| 5,378,918 A | 1/1995 | Ottl |
| 5,494,554 A | 2/1996 | Edwards et al. |
| 5,678,447 A | 10/1997 | Graff |
| 5,710,432 A | 1/1998 | Bell |
| 5,778,724 A | 7/1998 | Clapp et al. |
| 5,814,730 A | 9/1998 | Brodeur et al. |
| 5,877,431 A | 3/1999 | Hirano |
| 5,971,315 A | 10/1999 | Kojo |
| 6,175,421 B1 | 1/2001 | Fuchs et al. |
| 6,200,423 B1 | 3/2001 | Georger et al. |

* cited by examiner

METHOD TO MEASURE TENSION IN A MOVING WEB AND TO CONTROL PROPERTIES OF THE WEB

BACKGROUND

Products made from base webs such as bath tissues, facial tissues, paper towels, industrial wipers, food service wipers, napkins, medical pads, and other similar products are designed to include several important properties. For example, the products should have a soft feel and, for most applications, should be highly absorbent. The products should also have good stretch characteristics and should resist tearing. Further, the products should also have good strength characteristics, should be abrasion resistant, and should not deteriorate in the environment in which they are used.

In the past, many attempts have been made to enhance and increase certain physical properties of such products. Unfortunately, when steps are taken to increase one property of these products, other characteristics of the products may be adversely affected. For instance, the softness of non-woven products, such as various paper products, can be increased by several different methods such as by selecting a particular fiber type or by reducing cellulosic fiber bonding within the product. Increasing softness according to one of the above methods, however, may adversely affect the strength of the product. Conversely, steps normally taken to increase the strength of a fibrous web typically have an adverse impact upon the softness, the stiffness, or the absorbency of the web.

In order to produce products of desired characteristics, and to ensure the processes that create these products runs smoothly, properties of the web during production are often monitored. One such property that allows for the characteristics of the web to be controlled is the tension of the web. Properties which can be controlled based on the tension of the moving web include but are not limited to strength related properties such as machine direction modulus, basis weight, moisture, and properties that relate to softness. However, other measurements of different properties of the web must sometimes be made in order to control some of the aforementioned properties.

Measurement of the tension is also helpful in preventing breaks of the web during production of a paper product. A papermaking machine can be modified if the recorded tension is high enough to subject the web to breaking. Such a modification of the production process to avoid these web breaks can prevent downtime of the papermaking machine.

Various ways of measuring the tension of a moving web are known in the art. For instance, U.S. Pat. No. 4,833,928 discloses a non-contacting tension measurement method by which a microphone induces sound waves in the web which are subsequently detected by microphones installed close to the web. Additionally, the tension in a moving web may be measured by contacting the web with rolls that have force transducers or load cells mounted therein to measure the tension in the moving web. Such a way of measuring the tension of a moving web is known in the art as a contacting tension measurement system. A non-contacting method to measure the tension in a moving web exists by forming a wave on the web by means of a blast of compressed air. The subsequent wave is then measured and this measurement is used to calculate the tension of the web.

Another patent indicative of a process and apparatus that measures tension in a moving web is U.S. Pat. No. 3,854,329. This patent is directed towards a non-contacting method that makes use of a loud speaker and a microphone to create and measure a vibration in the moving web to determine the tension.

A method of measuring the tension in a moving web when the tension is low, and the web speed is high is unique to this application. Additionally, a process of measuring the tension on a wide commercial tissue machine at both high speed and low tension is unique to the present application. Also, a method that is suitable for commercial production is further unique. Current machines do not disclose a way of measuring the tension on a moving web when the instability index of the web is greater than 0.5. Current machines measure the tension by using either a contacting method that typically will not work on a tissue web at high speeds, or by means of a sonic method that is only suitable for stiff webs where the instability index is low, typically less than 0.5.

SUMMARY

Objects and advantages of the invention will be set forth in part in the following description, or may be obvious from the description, or may be learned through practice of the invention.

The present invention provides for a process for determining the tension in a moving web. The process includes the steps of providing a web that is moving at a determined speed. The web has a determined basis weight. A wave is created in the moving web, and the speed of propagation of the wave is determined. The tension on the moving web is determined through a mathematical relationship between the wave speed, the basis weight of the web, and the speed of the web. The instability index of the web is greater than or equal to 0.5.

The process also includes an exemplary embodiment where the instability index of the web is greater than about 0.8.

The present invention also encompasses a process for producing a paper web that has substantially uniform properties. The process includes the steps of providing a moving paper web, and the determination of the tension on the paper web while the web is moving. The process also includes the step of adjusting a process condition of the web that effects modulus based on the determined tension to produce a web that has more uniform properties. The instability index of the web is greater than or equal to 0.5.

The present invention also includes an exemplary embodiment as immediately discussed where the step of determining the tension on the paper web includes the steps of creating a wave in the moving paper web and the determination of the speed of the propagation of the wave. Also, the step of determining the tension includes the step of calculating the tension on the moving web through a mathematical relationship between the wave speed, the basis weight of the paper, and the speed of the web.

The present invention also includes an embodiment as previously discussed where the step of determining the tension on the moving web occurs when the instability index of the web is about 0.8 or higher.

Another exemplary embodiment of the present invention includes a process for controlling a moving web. The process involves the provision of a web that is moving at a determined speed. The web has a determined basis weight. A wave is generated in the moving web and the speed of the wave in the web is measured. The process further includes the determination of the instability index. The instability index is in a desired range, that being between about 0.6 and 1.0.

Alternatively, the immediately identified exemplary embodiment of the present invention may also be modified in accordance with the present invention where the desired range of the instability index is between about 0.6 and about 0.9, between about 0.8 and 1.0, and between 0.7 and 1.0.

Also provided in accordance with the present invention is an apparatus for measuring the instability index in a moving web. The apparatus includes an air pulse that is used to apply a pulse of fluid to the web to create a wave in the web. As least two laser displacement transducers are present for measuring the displacement of the web as the wave moves through the web. A computer is also present which obtains signals from the at least two laser displacement transducers. The computer calculates the instability index in the web based on the speed of the wave in the web and the speed of the web.

Alternatively, the present invention includes an exemplary embodiment of the apparatus as immediately discussed where the computer calculates the tension in the web while the instability index of the web is greater that about 0.8.

The present invention also includes an exemplary embodiment of a process for producing a paper web that has substantially uniform properties. The process includes the steps of providing a moving paper web, and determination of the tension on the paper web while the web is moving. The instability index of the web is greater than or equal to 0.5. Further, the process includes the step of adjusting the cross directional dryer coating of the web based on the determined tension of the web. Additionally, the creping chemistry is adjusted based on the instability index.

Another exemplary embodiment of the present invention includes a process for producing a paper web that has at least two flows of different strengths. The process includes the step of providing a moving layered paper web, and providing at least one hardwood flow and at least one softwood flow. These flows form at least one hardwood layer and at least one softwood layer of the paper web. The tension on the paper web is determined while the web is moving. The tension of the paper web is controlled by increasing the hardwood flow and decreasing the softwood flow in regions of high tension, maintaining a uniform basis weight. Further, softwood flow is increased and hardwood decreased in regions of low tension so that the tension is uniform, maintaining a uniform basis weight.

Also, the present invention includes an exemplary embodiment of the process as immediately discussed where the instability index of the web is greater than or equal to 0.5.

BRIEF DESCRIPTION OF THE DRAWINGS

An embodiment of the present invention is described by way of example with reference to the accompanying drawings, in which:

FIG. 4 shows the web before a blast of fluid contacts the web.

FIG. 5 shows a wave propagating through the web.

FIG. 6 shows a wave passing over a first laser transducer and being measured by the first laser transducer.

FIG. 7 shows a wave passing over a second laser transducer and being measured by the second laser transducer.

FIG. 9 shows the tension during a turn-up with Hercobond addition.

FIG. 10 shows the tension during a turn-up without Hercobond being added.

FIG. 11 shows the changes in tension from different crepe ratios on tissue machine #1.

FIG. 12 shows the cross directional profile under tissue machine #1.

FIG. 13 shows the tension measurements through a continuous softroll on tissue machine #1.

FIG. 14 shows the tension measured with a DDWS foil that is raised and retracted on tissue machine #1.

FIG. 15 shows the process of creating a wave in the web, obtaining signals from the laser displacement transducers, processing the signals, calculating the tension, and controlling the process as a result of the calculated tension.

DETAILED DESCRIPTION

Figure 1:
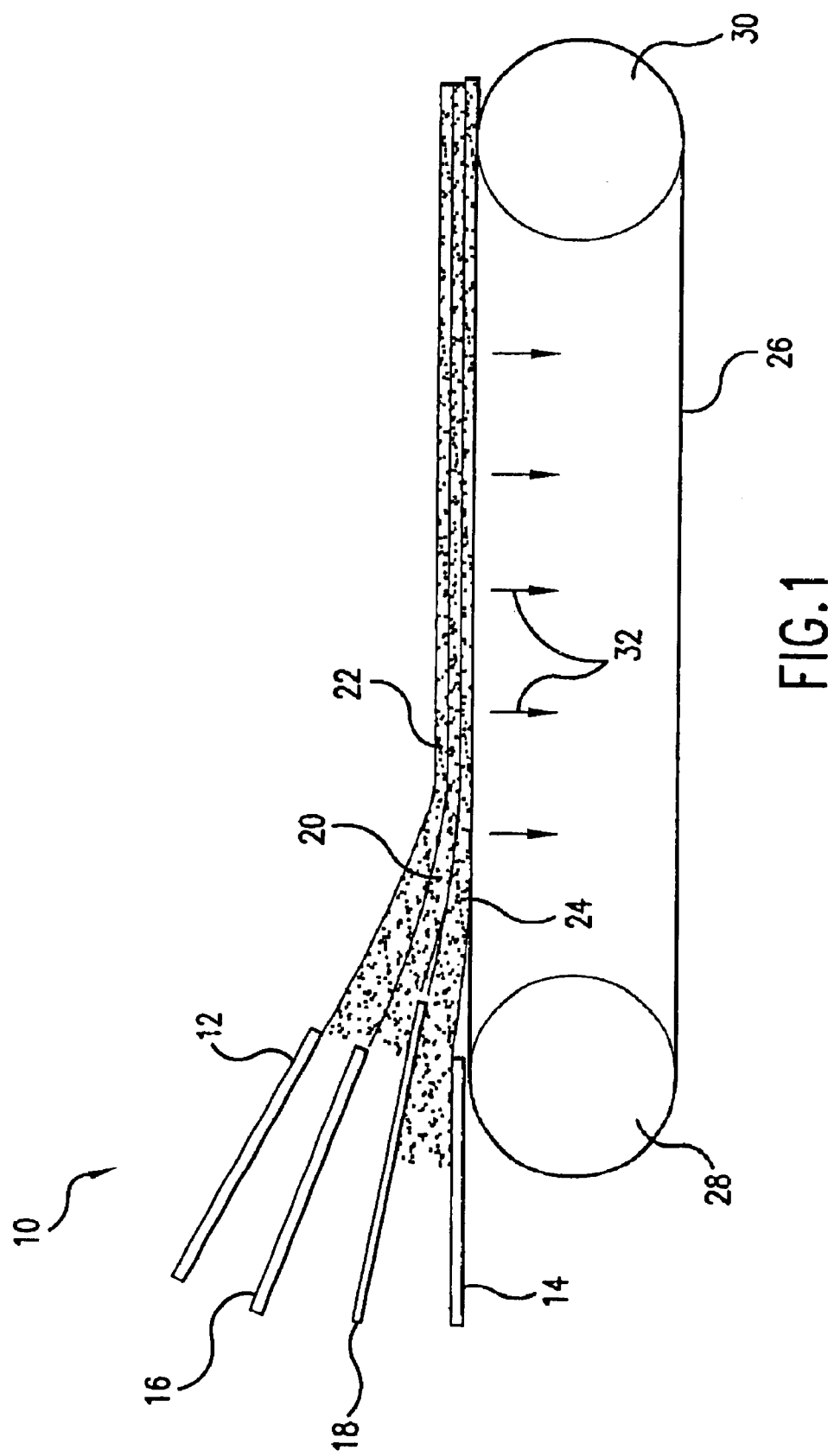
FIG. 1 is a schematic diagram of a web forming machine that illustrates one exemplary embodiment for forming a web that has multiple layers in accordance with an exemplary embodiment of the present invention.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention relates to a process and apparatus for measuring the tension in a moving web. In particular, exemplary embodiments of the present invention allow for the tension of a high speed moving web to be monitored and then used to modify various properties and conditions of the web and of the process producing the web. Layer splits of the web may be maintained by monitoring and adjusting the tension profile of the web.

Webs that may be used in the process of the present invention can vary depending upon the particular application. In general, any suitable web or film may be used in the process in order to measure the tension of the web. Further, the webs can be made from any suitable type of fiber. It should be understood that in the claims, the word "web" is defined to include woven webs, non-woven webs, and films.

For example, the manner in which the web of the present invention is formed may vary depending upon the particular application. In one exemplary embodiment, the web can contain pulp fibers and can be formed in a wet-lay process according to conventional paper making techniques. In a wet-lay process, the fiber furnish is combined with water to form an aqueous suspension. The aqueous suspension is spread onto a wire or felt and dried to form the web. Alternatively, the web of the present invention can be air formed. In this exemplary embodiment, air is used to transport the fibers and form a web. Air-forming processes are typically capable of processing longer fibers than most wet-lay processes, which may provide an advantage in some applications.

Figure 2:
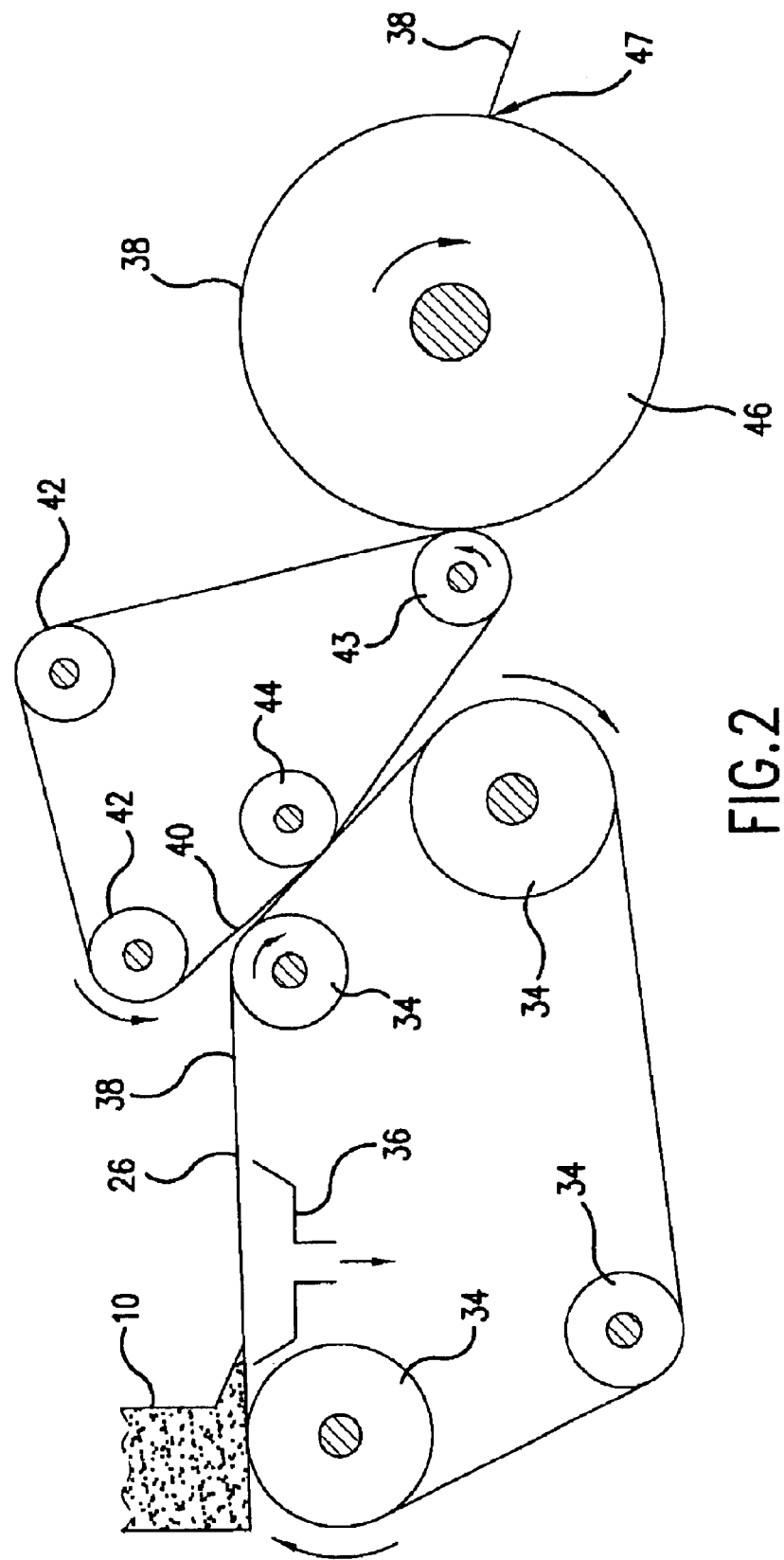
FIG. 2 is a schematic diagram of a web forming machine that crepes one side of the web.

Referring to FIG. 2, one embodiment of a process for producing a web that may be used in accordance with the present invention is illustrated. The process illustrated in the figure depicts a wet-lay process, although, as described above, other techniques for forming the web of the present invention may be used.

As shown in FIG. 2, the web-forming system includes a headbox 10 for receiving an aqueous suspension of fibers. Headbox 10 spreads the aqueous suspension of fibers onto a forming fabric 26 that is supported and driven by a plurality of guide rolls 34. A vacuum box 36 is disposed beneath forming fabric 26 and is adapted to remove water from the fiber furnish to assist in forming the web.

From forming fabric 26, a formed web 38 is transferred to a second fabric 40, which may be either a wire or a felt. Fabric 40 is supported for movement around a continuous path by a plurality of guide rolls 42. Also included is a pick up roll 44 designed to facilitate transfer of web 38 from fabric 26 to fabric 40. The speed at which fabric 40 can be driven is approximately the same speed at which fabric 26 is driven so that movement of web 38 through the system is consistent. Alternatively, the two fabrics can be run at different speeds, such as in a rush transfer process, in order to increase the bulk of the webs or for some other purpose.

From fabric 40, web 38, in this exemplary embodiment, is pressed onto the surface of a rotatable heated dryer drum 46, such as a Yankee dryer, by a press roll 43. Web 38 is lightly pressed into engagement with the surface of dryer drum 46 to which it adheres, due to its moisture content and its preference for the smoother of the two surfaces. As web 38 is carried through a portion of the rotational path of the dryer surface, heat is imparted to the web causing most of the moisture contained within the web to be evaporated.

Web 38 is then removed from dryer drum 46 by a creping blade 47. Creping web 38 as it is formed reduces internal bonding within the web and increases softness.

In an alternative exemplary embodiment, instead of wet pressing the base web 38 onto a dryer drum and creping the web, the web can be through-air dried. A through-air dryer accomplishes the removal of moisture from the web by passing air through the web without applying any mechanical pressure.

Figure 3:
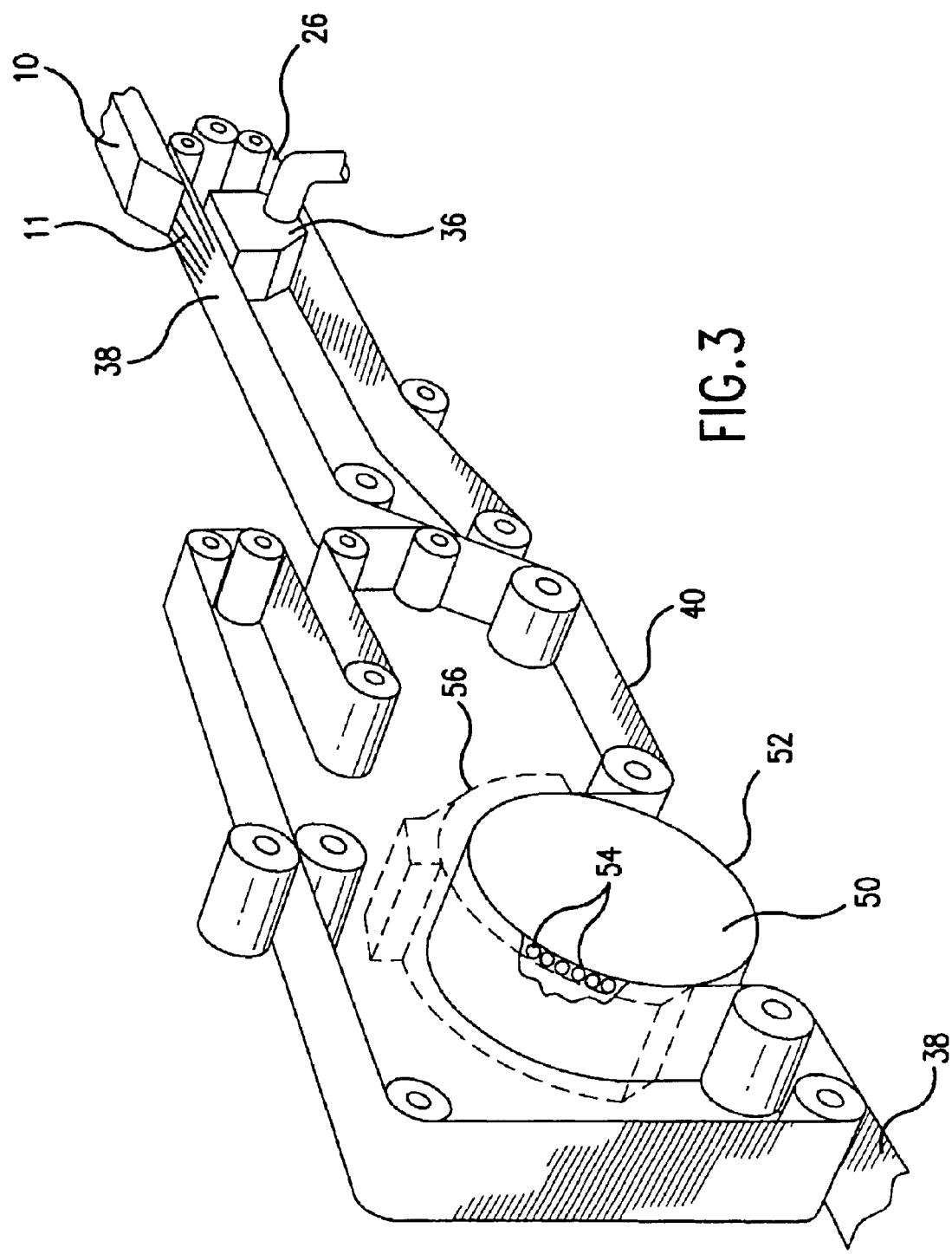
FIG. 3 is perspective view with cut-away portions of a web forming machine that includes a through-air dryer for removing moisture from the web.

For example, referring to FIG. 3, an alternative exemplary embodiment for forming a base web for use in the process of the present invention containing a through-air dryer is illustrated. As shown, a dilute aqueous suspension of fibers is supplied by a headbox 10 and deposited via a sluice 11 in uniform dispersion onto a forming fabric 26 in order to form a base web 38.

Once deposited onto the forming fabric 26, water is removed from the web 38 by combinations of gravity, centrifugal force and vacuum suction depending upon the forming configuration. As shown in this embodiment, and similar to FIG. 2, a vacuum box 36 can be disposed beneath the forming fabric 26 for removing water and facilitating formation of the web 38.

From the forming fabric 26, the web 38 is then transferred to a second fabric 40. The second fabric 40 carries the web through a through-air drying apparatus 50. The through-air dryer 50 dries the web 38 without applying a compressive force in order to maximize bulk. For example, as shown in FIG. 3, the through-air drying apparatus 50 includes an outer rotatable cylinder 52 with perforations 54 in combination with an outer hood 56. Specifically, the fabric 40 carries the web 38 over the upper portion of the through-air drying apparatus outer cylinder 52. Heated air is drawn through perforations 54 which contacts the web 38 and removes moisture. In one exemplary embodiment, the temperature of the heated air forced through the perforations 54 can be from about 170° F. to about 500° F.

As stated, properties of the web 38 and also of the apparatus that produces the web 38 can be controlled and monitored if the tension in web 38 is known. The tension in web 38 can be correlated with several process conditions in order to determine the process conditions during a particular build of web 38 and make adjustments. Some of the process conditions which can be varied based on the tension in web 38 include the following: the chemical addition rate, the cross directional profile of the basis weight and moisture in web 38, draws on web 38, crepe ratio, and the winding profile of a tissue roll off of a tissue machine. By taking the correlation between the tension in web 38 and these various process conditions, one can incorporate the speed of web 38 and the basis weight of web 38 with the tension to produce an on-line method that controls the machine direction strength and/or modulus of the tissue web 38. However, adjustments to the machine and process can be made based on only the tension alone.

Figure 4:
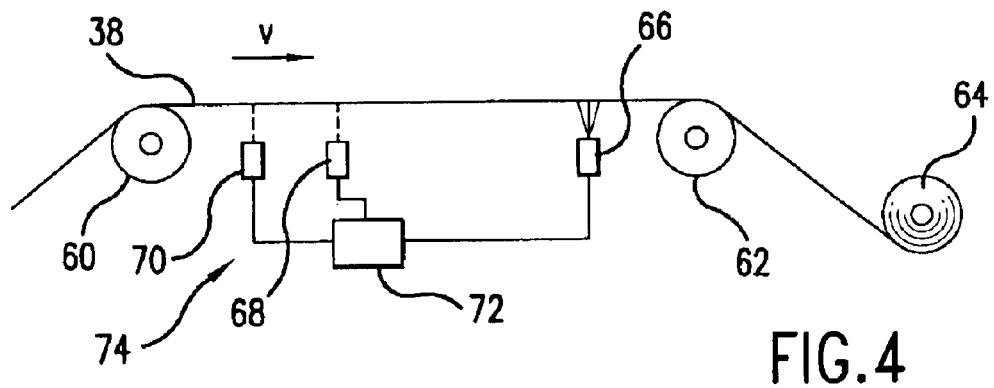
FIG. 4 is a schematic view of an exemplary embodiment of the present invention.

FIG. 4 shows a schematic view of an exemplary embodiment of a tension apparatus 74 that can monitor and/or control properties of the web 38 and the process that produces web 38. The exemplary embodiment of the tension apparatus 74 includes a computer 72 that is connected to both an air pulse 66 and a first and second laser transducer 68 and 70 respectively. However, it is to be understood that in other exemplary embodiments of the present invention, air pulse 66 along with the first and second laser transducers 68 and 70 do not need to be directly controlled by computer 72. The tension apparatus 74 is located adjacent to a run of the web 38 that is between two rollers 60 and 62. The web 38 is moving in the direction shown by arrow V in FIG. 4, and is moving at a velocity v. Web 38 is wound onto a wound roll 64.

Figure 5:
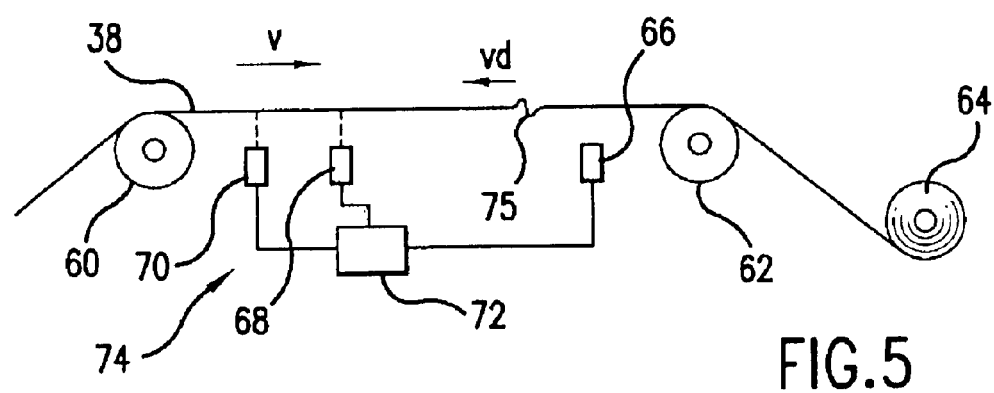
FIG. 5 is a schematic view of an exemplary embodiment of the present invention.
Figure 6:
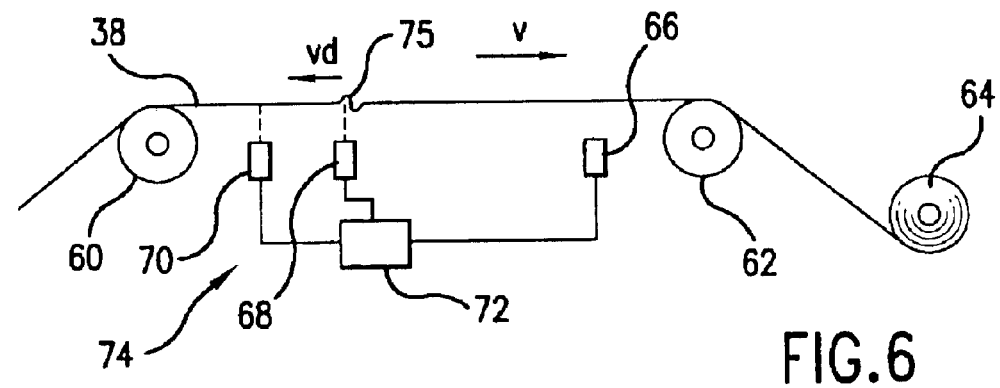
FIG. 6 is a schematic view of an exemplary embodiment of the present invention.
Figure 7:
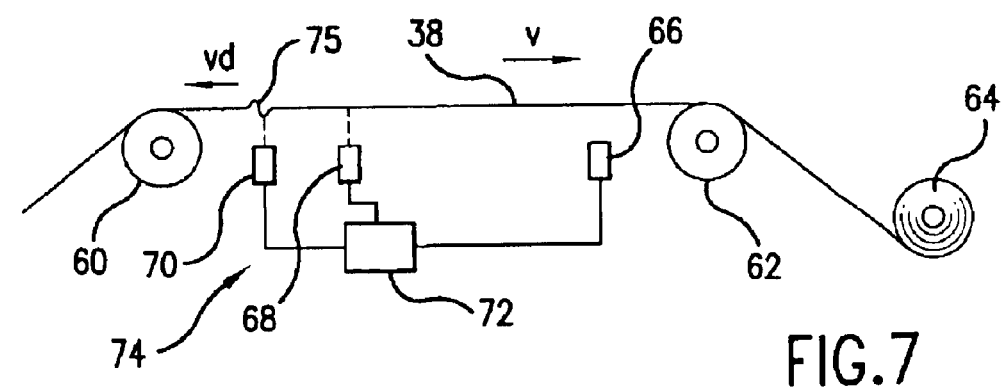
FIG. 7 is a schematic view of an exemplary embodiment of the present invention.

Tension apparatus 74 can calculate the tension in the web 38 by a non-contacting process. First, the air pulse 66 can fire a fluid, for instance air, onto web 38 which causes a disturbance in web 38. Such a disturbance is shown in FIG. 5 as being a wave 75. Wave 75 will travel in a direction vd shown in FIG. 5 at a velocity vd away form the air pulse 66. Wave 75 travels through web 38 much like a stone that is thrown into a pond which causes ripples to travel across the surface of the pond. Here however, since web 38 is moving in a direction v, the analogy to a stone in a pond is not entirely accurate. A closer analogy would be to that of a stone thrown into a moving river since the web 38 is moving at a velocity v. FIGS. 6 and 7 show the wave 75 being situated above the first laser transducer 68 and the second laser transducer 70 as the wave 75 moves across the surface of web 38. As wave 75 moves across each one of these laser transducers 68 and 70, the tension apparatus 74 can measure the speed of wave 75. The use of laser transducers 68 and 70 allow for high speed measurements, an advantage of the present invention.

The first and second laser transducers 68 and 70 therefore determine the exact time that wave 75 travels above the respective transducer 68 and 70. From this information, the computer 72 can use an algorithm to determine the speed of the wave 75. The tension apparatus 74 is also capable of measuring the speed v of the web 38. However, in other exemplary embodiments of the present invention, the speed v of web 38 is determined not by the tension apparatus 74, but by some other method. The tension apparatus 74 may use a similar algorithm to calculate the speed v of web 38. The tension in web 38 may be determined by the computer 72 by taking into account the wave speed vd, the web speed v, and the basis weight of the web 38.

In one exemplary embodiment of the present invention, the pulse of air from the air pulse 66 is a short duration pulse. The pulse may be about 15 milliseconds of air at a pressure of about 80 pounds per square inch. The first and second laser transducers 68 and 70 may be high speed transducers with a response time faster than one millisecond. Faster transducers, such as those that have response times as fast as 10 microseconds may also be used. The first and second laser transducers 68 and 70 are aimed at the web 38 and are positioned upstream from the air pulse 66. In one exemplary embodiment, the first and second laser transducers 68 and 70 are positioned 50 millimeters from the air pulse 66. However, it is to be understood that in other exemplary embodiments of the present invention, the first and second laser transducers 68 and 70 may be positioned downstream from the air pulse 66 or at other distances upstream from the air pulse 66. In another exemplary embodiment of the present invention, the first laser transducer 68 is spaced 40 millimeters from the second laser transducer 70.

A computer program that is administered by computer 72 can control the air pulse 66 to create a wave 75. The computer program will then record the displacement output from each laser transducer 68 and 70. This resulting data is bandpass filtered to eliminate any short and long wave length flutter associated with the web 38. The signal may then be differentiated to amplify any change in position that is due to the wave 75 passing in front of the laser transducers 68 and 70. The two signals may than be passed through a window filter to force the end points to a zero level. However, in other exemplary embodiments of the present invention it is not necessary to pass the two signals through a window filter to force the end points to a zero level. Next, the signals may be mathematically cross-correlated to determine the most likely time delay between the two signals. This time delay, in accordance with the displacement from the first and second laser transducers 68 and 70, yields the actual wave speed vd.

The tension is determined by the following equation:

$$\text{Tension} = BW \times (vd + v)^2$$

In this equation, BW is the basis weight, vd is the measured wave speed, and v is the web speed. The addition of the wave speed vd to the web speed v is necessary because the wave 75 is traveling upstream and is thus slowed down by the movement of web 38. If the laser transducers 68 and 70 were positioned downstream of the air pulse 66, the equation for the tension would be changed accordingly.

The web speed v and the basis weight may be measured independently from the tension apparatus 74 in other exemplary embodiments of the present invention. However, the web speed v can be measured using the tension apparatus 74 by recording the light intensity of the reflected laser light from the first and second laser transducers 68 and 70 and then filtering the signal over a specific frequency range.

The instability index of web 38 is a measure of the relative instability of the moving tissue web. As the instability index approaches unity, the web 38 becomes unstable. At an instability index of 1.0, a wave 75 would not be able to travel across the surface of web 38. Additionally, when the instability index is high, greater than 0.5, the tension measurements in current machines will not work. The instability index is governed by the following equation:

$$\text{Instability Index} = v/c = v/(v+vd)$$

Here, v is equal to the web speed and vd is equal to the measured wave speed. In the equation, c is the critical speed which is equal to the web speed v plus the measured wave speed vd. However, it may be the case that the critical speed c is equal to measured disturbance speed vd minus the web speed v in other exemplary embodiments of the present invention. This would be the case, for instance, when the laser transducers 68 and 70 were located downstream of the air pulse 66 instead of upstream in relation to the direction of travel of the web 38. The instability index as stated in the claims is one of these two formulas depending on the relative location of the laser transducers 68 and 70 and the air pulse 66.

Therefore, an exemplary embodiment of the present invention may utilize modern laser transducers 68 and 70 and high speed computers 72 to measure the tension in web 38. Computer 72 may then separate the natural flutter of the moving web 38 from the desired measurement. This is not required when a stable web is measured.

A tension profile of web 38 may be taken by placing an array of laser transducers on the cross direction of web 38. Other exemplary embodiments of the present invention may use multiple laser transducers to obtain a tension profile of the web 38 in order to adjust other properties of web 38.

Figure 15:
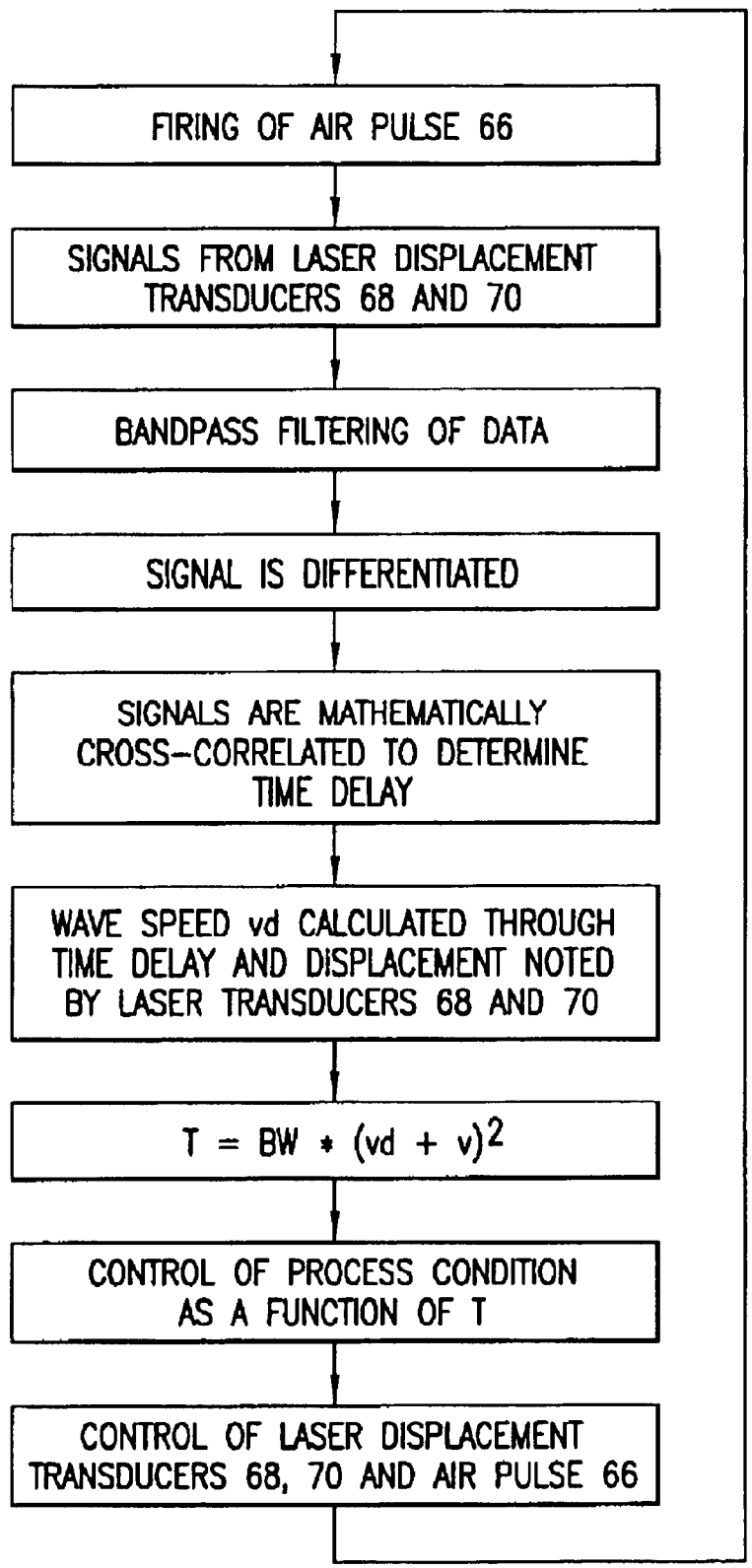
FIG. 15 is a flow diagram of a process of an exemplary embodiment of the present invention.

Knowledge of the tension in web 38 allows for the process that produces the web 38 to be monitored or controlled so that the properties of web 38 are improved or maintained, and the machine that produces web 38 is controlled or maintained. FIG. 15 shows a process algorithm of a tension apparatus 74 in accordance with an exemplary embodiment of the present invention. A sample listing of the process conditions that may be monitored or controlled by knowledge of the tension are as follows (this list is not inclusive):

wear on blade 47 in order to determine when to change blade 47;

the draw on a winder to maintain uniform tension in each section of the web 38;

the tension in a wound roll 64 of the web 38;

flow adjustments to control the cross-directional dryer coating of the web 38;

control of the cross-directional moisture profile based on a given basis weight profile and a single point moisture;

control of the cross-directional basis weight based on a given moisture profile and an average basis weight from a softroll weight;

control of the web 38 during turn-ups by optimizing the sequence to maintain a desired tension;

control of the web 38 during turn-ups by chemical addition on web 38 to maintain a desired tension;

control of the web 38 instability by adjusting foils in response to the instability index calculated when performing the tension measurement;

control of the web 38 instability by creping chemistry in response to the instability index calculated when performing the tension measurement;

control of the web 38 handling by keeping the instability index in a desired range by adjusting the creping chemistry at a certain web speed v;

control of the web 38 handling by adjusting foil positions to maintain the runability at a given web speed v based on the instability index.

In addition, other control properties may be controlled based on the tension measured in web 38.

Figure 8:
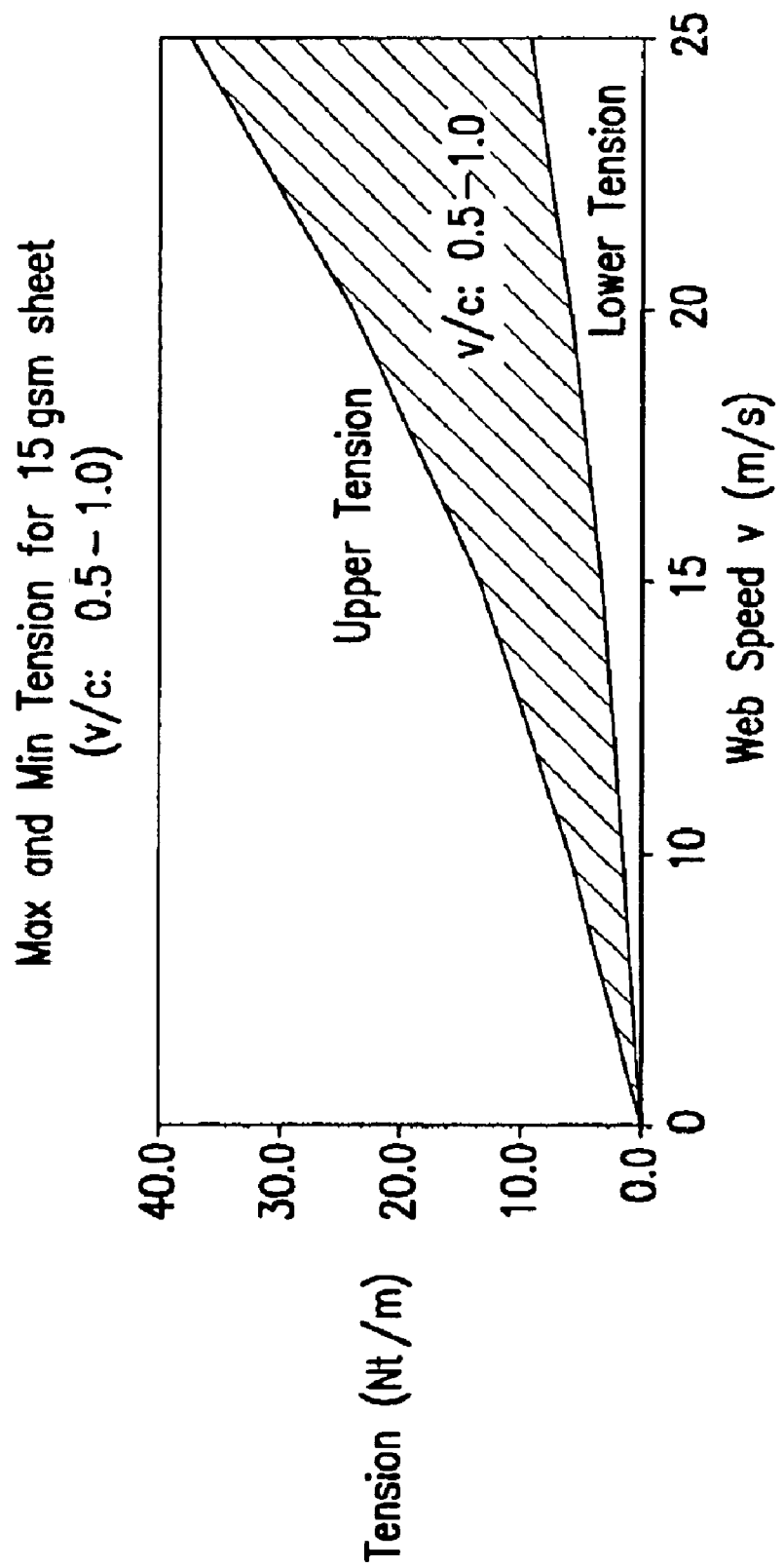
FIG. 8 is a graph of the web speed versus the tension in an exemplary embodiment of the present invention. The graph shows a 0.5 to 1.0 instability index for a 15 gsm web.

FIG. 8 shows a plot of the web speed v in relation to the tension in accordance with another exemplary embodiment of the present invention. Here, the basis weight of the web 38 is 15 gsm. The cross-hatched area of FIG. 8 represents an instability index of 0.5 to 1.0. Although an exemplary embodiment of the present invention is capable of measuring an instability index of 0.5 to 1.0, it is to be understood that the present invention also encompasses exemplary embodiments where the instability index may be less than 0.5. Therefore, the present invention is not limited to only a tension apparatus 74 that can measure instability indexes from 0.5 to 1.0, but a tension apparatus 74 that may measure at various instability indexes.

An exemplary embodiment of the present invention also includes a process for producing a paper web 38 that has at least two flows of different strengths. The at least two flows may be placed to form fiber layers such as those shown in FIG. 1. Here, one of the fiber layers 22 may be formed by a softwood while another fiber layer 20 may be formed by a hardwood. The process would involve the provision of a moving web 38 along with at least one hardwood layer 22 and one softwood layer 20. The tension of the web 38 is measured and may be controlled by increasing the flow feeding into the hardwood layer 20 or decreasing the flow into the softwood layer 22 in regions of high tension. The flow into the softwood layer 22 is increased or the flow into the hardwood layer 20 is decreased in regions of low tension on web 38. Such modifications allows for a uniform tension in the web 38. Additionally, a uniform basis weight may be maintained in the process by adjusting the flows of the hardwood or softwood layers 20 and 22. Therefore, the flow of layers onto the web 38 can be controlled based on the tension in the web 38.

In an alternative exemplary embodiment, a stratified web can be used that has outer layers having a greater tensile strength than a middle layer. There are various methods available for creating stratified webs. For instance, referring to FIG. 1, one exemplary embodiment of a device for forming a multi-layered stratified fiber furnish is illustrated. As shown, a three-layered headbox 10 may include an upper headbox wall 12 and a lower headbox wall 14. Headbox 10 may further include a first divider 16 and a second divider 18, which separate three fiber stock layers. Each of the fiber layers 24, 20, and 22 comprise a dilute aqueous suspension of fibers.

An endless traveling forming fabric 26, suitably supported and driven by rolls 28 and 30, receives the layered stock issuing from headbox 10. Once retained on fabric 26, the layered fiber suspension passes water through the fabric as shown by the arrows 32. Water removal is achieved by combinations of gravity, centrifugal force and vacuum suction depending on the forming configuration.

Forming multi-layered webs is also described and disclosed in U.S. Pat. No. 5,129,988 to Farrington, Jr. and in U.S. Pat. No. 5,494,554 to Edwards, et al., which are both incorporated herein by reference, in their entirety for all purposes in the present application.

In forming stratified base webs, various methods and techniques are available for creating layers that have different tensile strengths. For example, debonding agents can be used as described above in order to alter the strength of a particular layer.

Alternatively, different fiber furnishes can be used for each layer in order to create a layer with desired characteristics. For example, in one exemplary embodiment, softwood fibers can be incorporated into a layer for providing tensile strength, while hardwood fibers can be incorporated into an adjacent layer for creating a weaker tensile strength layer.

More particularly, it is known that layers containing hardwood fibers typically have a lower tensile strength than layers containing softwood fibers. Hardwood fibers have a relatively short fiber length. For instance, hardwood fibers can have a length of less than about 2 millimeters and particularly less than about 1.5 millimeters.

In one exemplary embodiment, the hardwood fibers incorporated into a layer of the web 38 include eucalyptus fibers. Eucalyptus fibers typically have a length of from about 0.8 millimeters to about 1.2 millimeters. When added to the web 38, eucalyptus fibers increase the softness, enhance the brightness, increase the opacity, and increase the wicking ability of the web.

Besides eucalyptus fibers, other hardwood fibers may also be incorporated into the web 38 of the present invention. Such fibers include, for instance, maple fibers, birch fibers and possibly recycled hardwood fibers.

In general, the above-described hardwood fibers can be present in the web 38 in any suitable amount. For example, the fibers can comprise from about 5% to about 100% by weight of one layer of the web 38.

The hardwood fibers can be present within the lower tensile strength layer of the web 38 either alone or in combination with other fibers, such as other cellulosic fibers. For instance, the hardwood fibers can be combined with softwood fibers, with superabsorbent materials, and with thermomechanical pulp.

As described above, stronger tensile strength layers can be formed using softwood fibers, especially when adjacent weaker tensile strength layers are made from hardwood fibers. The softwood fibers can be present alone or in combination with other fibers. For instance, in some exemplary embodiments, staple fibers, such as synthetic fibers, can be combined with the softwood fibers.

The weight of each layer of a stratified base web 38 in relation to the total weight of the web 38 is generally not critical. In most exemplary embodiments, however, the weight of each outer layer will be from about 15% to about 40% of the total weight of the web 38, and particularly from about 25% to about 35% of the weight of the web 38.

The basis weight of webs made according to the present invention can vary depending upon the particular application. In general, for most applications, the basis weight can be from about 5 pounds per 2,880 square feet (ream) (8.5 gsm) to about 80 pounds per ream (136 gsm), and particularly from about 6 pounds per ream (10.2 gsm) to about 30 pounds per ream (51 gsm). In one exemplary embodiment, the present invention can be used to construct a single ply bath tissue having a basis weight of from about 20 gsm to about 40 gsm. Some other uses of the webs include use as a wiping product, as a napkin, as a medical pad, as an absorbent layer in a laminate product, as a placemat, as a drop cloth, as a cover material, as a facial tissue, or for any product that requires liquid absorbency.

Experiments Involving Exemplary Embodiments of the Present Invention

Applicants have conducted experiments in regards to the tension apparatus 74 in measuring the tension in a moving web 38. The objective of the experiments were to verify that the tension apparatus 74 could accurately measure the tension on a commercial low tension, high speed machine. Additionally, the experiment was carried out in order to determine whether the tension could be monitored over a long period of time on both a tissue machine and a winder or rewinder. It was found that the tension in the web 38 was related to certain properties and problems concerning the web 38 and the machine that processes web 38.

A tension apparatus 74 was placed on a tripod under a moving web 38 on a tissue machine. The tension apparatus 74 was between 50–60 inches from the drive side edge of the web 38 which was approximately 204 inches wide. On the tissue machine, the tension apparatus 74 was able to pick up changes after the addition of processed chemicals, crepe ratio, and the cross directional profile.

Figure 9:
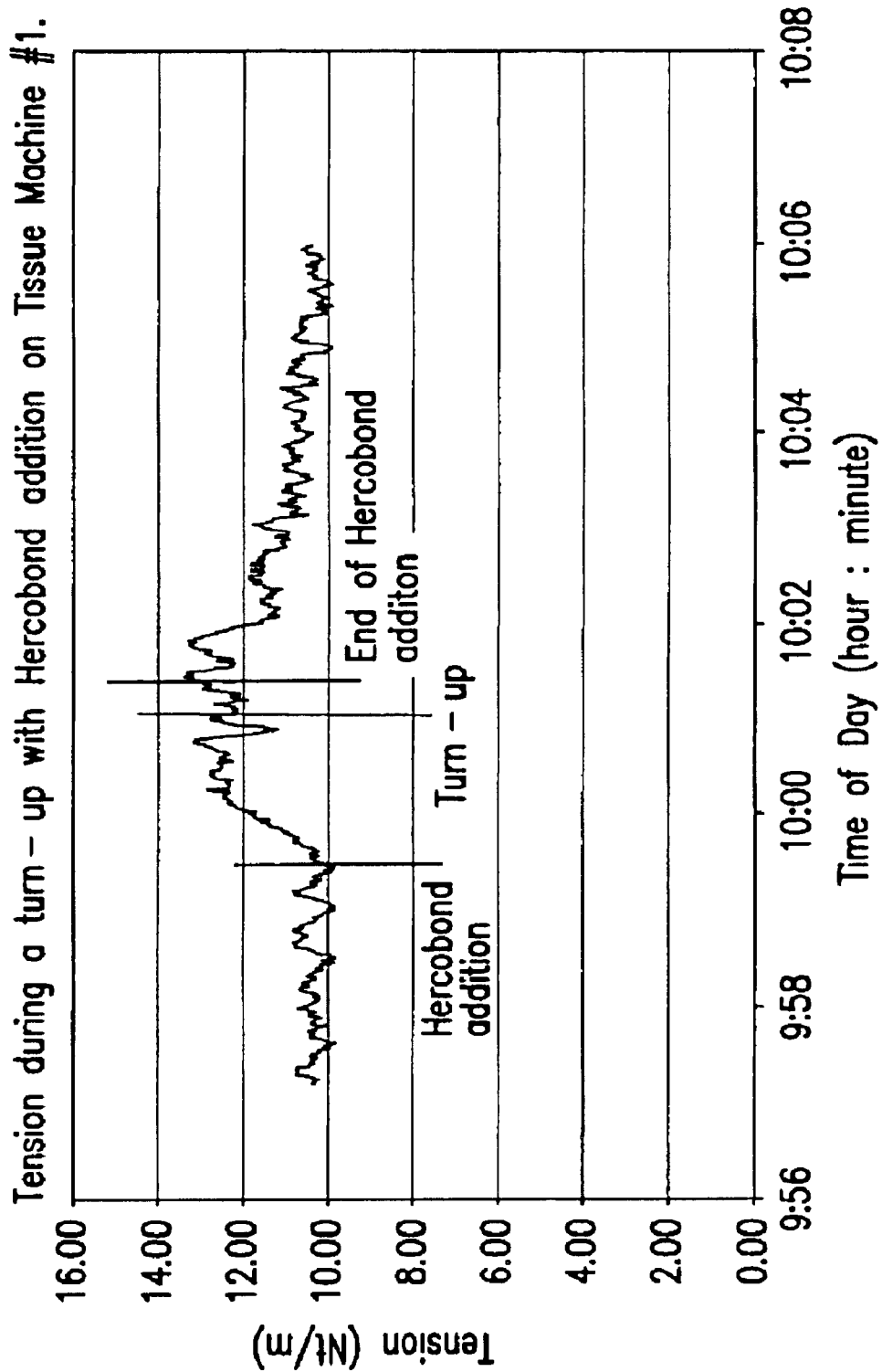
FIG. 9 is a graph of time versus tension for another exemplary embodiment of the present invention.

During a selected number of turn-ups, a chemical strengthening agent, Hercobond, was added. Hercobond increases the web 38 strength so that there is a more likely probability of a successful turn-up. When the tension apparatus 74 was placed under the tissue machine, the tension apparatus 74 was able to accurately pick up the addition of Hercobond. Before the Hercobond was added, the tension was approximately 10.3 Newtons per meter. After the addition of Hercobond, the peak of the tension averaged to 12.4 Newtons per meter. FIG. 9 shows the tension being increased as Hercobond was added 2000 yards before the turn-up. The web speed v was 3906 feet per minute, meaning that the chemical addition occurred 92 seconds before turn-up. The timing of Hercobond addition is noted in FIG. 9. The downward spike of tension immediately before the turn-up is unrelated to the Hercobond addition as this is the moment when the web 38 is being blown over a new roll before being attached thereon. After the turn-up, it took approximately 5 minutes before the tension returned to its original level while the Hercobond was phasing out of the process.

Figure 10:
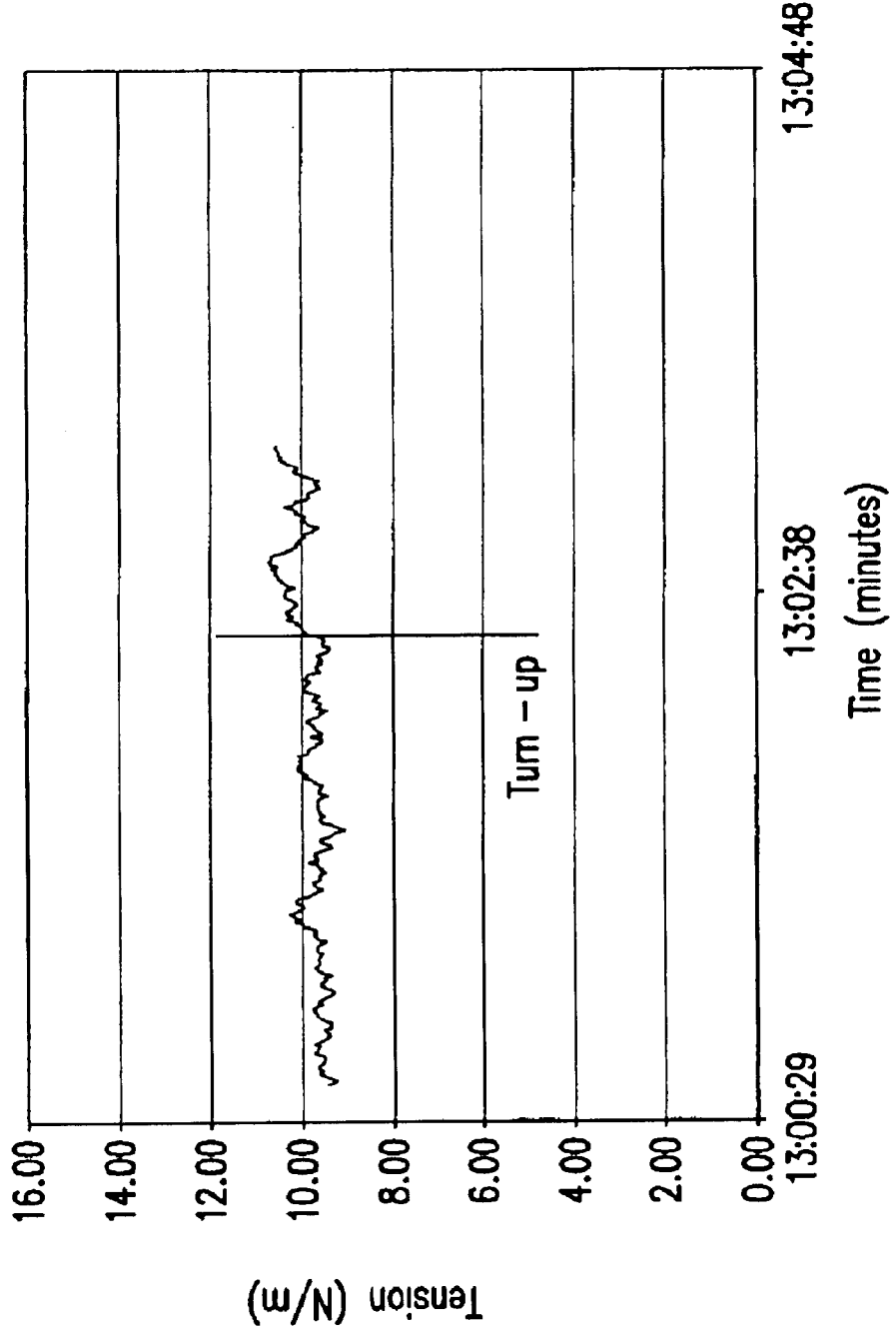
FIG. 10 is a graph of time versus tension for another exemplary embodiment of the present invention.

FIG. 10 shows a tun-up without Hercobond for comparison. FIG. 10 demonstrates that the tension does not increase before the turn-up as it did when Hercobond was added. Tissue samples were taken from the ends of both rolls once they were on the reel to verify the increase in tension. Below is a table listing the data from each roll and it shows that the roll with Hercobond had higher strength properties:

|             | Hercobond | Without Hercobond |
|-------------|-----------|-------------------|
| MD Strength | 1420      | 1060              |
| CD Strength | 834       | 630               |
| Wet CD      | 199       | 149               |
| MD Stretch  | 30.9      | 31.6              |
| GMT         | 1090      | 814               |
| MD/CD Ratio | 1.7       | 1.68              |
| WCD/CD Ratio| 23.8      | 23.8              |

Figure 11:
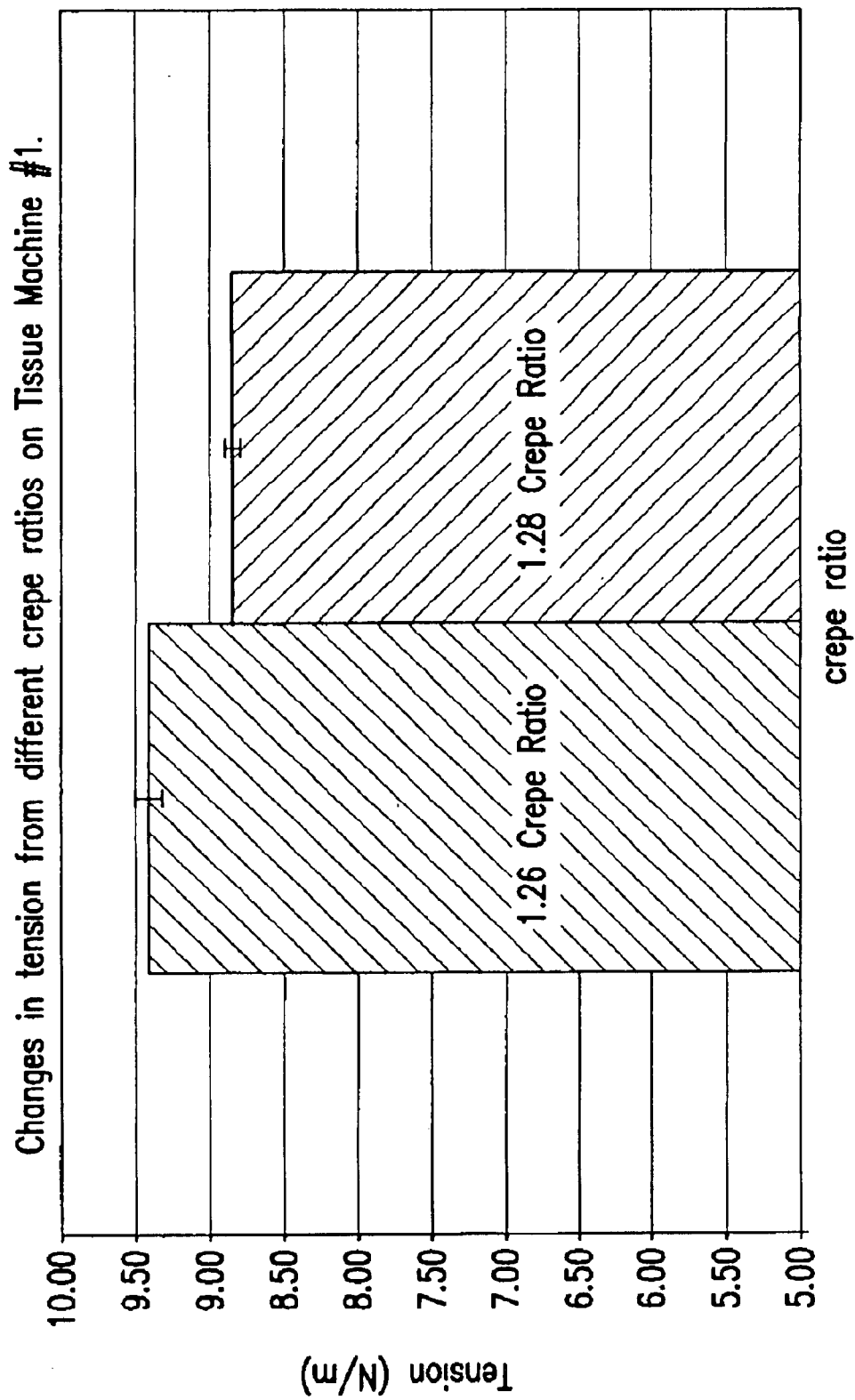
FIG. 11 is a graph of crepe ratio versus tension for another exemplary embodiment of the present invention.

The tension apparatus 74 was also able to note a change in crepe ratio. A machine onto which the present experiment was conducted, tissue machine #1, normally runs at a 1.28 crepe ratio. For approximately two minutes the crepe ratio was changed to 1.26 to determine whether the tension apparatus 74 could pick up the change. FIG. 11 shows the change in crepe ratio that the tension apparatus 74 detected. The error bars shown are with a 99% confidence level. At 1.26 crepe ratio, the average tension was 9.4 Newtons per meter, and at the 1.28 crepe ratio the average tension was 8.9 Newtons per meter. For a higher crepe ratio, the tension should be lower, meaning that the tension apparatus 74 accurately picked up the change.

Figure 12:
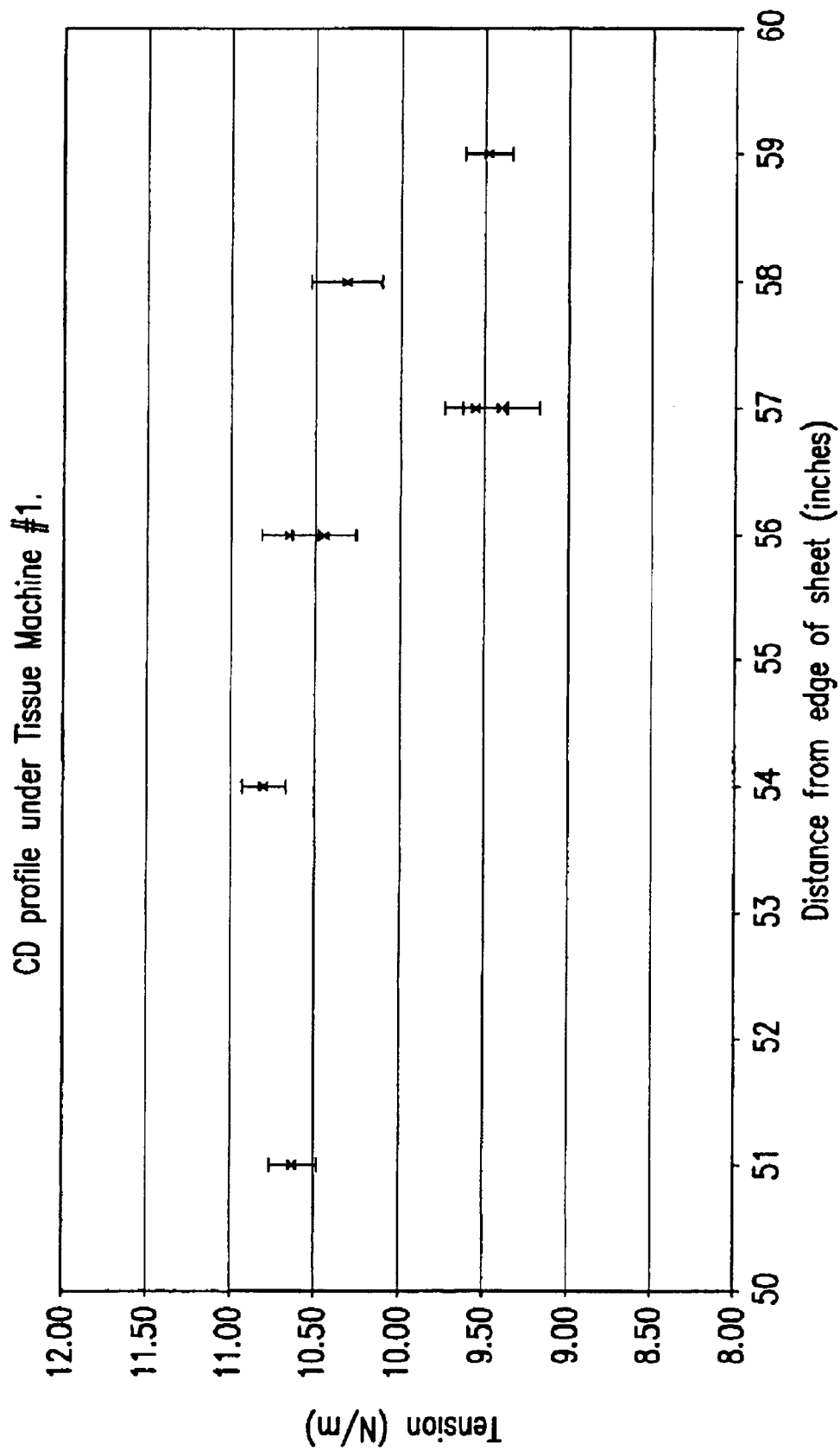
FIG. 12 is a graph of the distance from the edge of a sheet versus tension for an exemplary embodiment of the present invention.

Across a tissue web 38, the goal is to keep the moisture profile and basis weight uniform. Here however, the moisture profile and basis weight was not uniform. Therefore, the tension across the tissue web 38 is also not uniform. When the tension apparatus 74 was placed under the web 38, it was moved in six different positions within one foot to determine whether there were any variations in the cross direction. Data was collected at each position for approximately two minutes and then was repeated in a random manner to eliminate time variables. FIG. 12 shows the cross directional profile that the tension apparatus 74 recorded. The error bars shown are with a 99% confidence level. At 56 inches from the drive side, the tension averaged to 10.6 Newtons per meter. At 75 inches across, the tension averaged to 9.5 Newtons per meter. Using data from tissue samples correlating with previous strength properties, this 11.4% increase in tension relates to an 18.2% increase in cross directional strength and a 19.4% increase in MD strength. There is a statistical difference between the last four inches on the chart. However, upon examining the scanning profile of the basis weight and moisture profiles, the differences were not correlated to any specific variable on the profiles.

Figure 13:
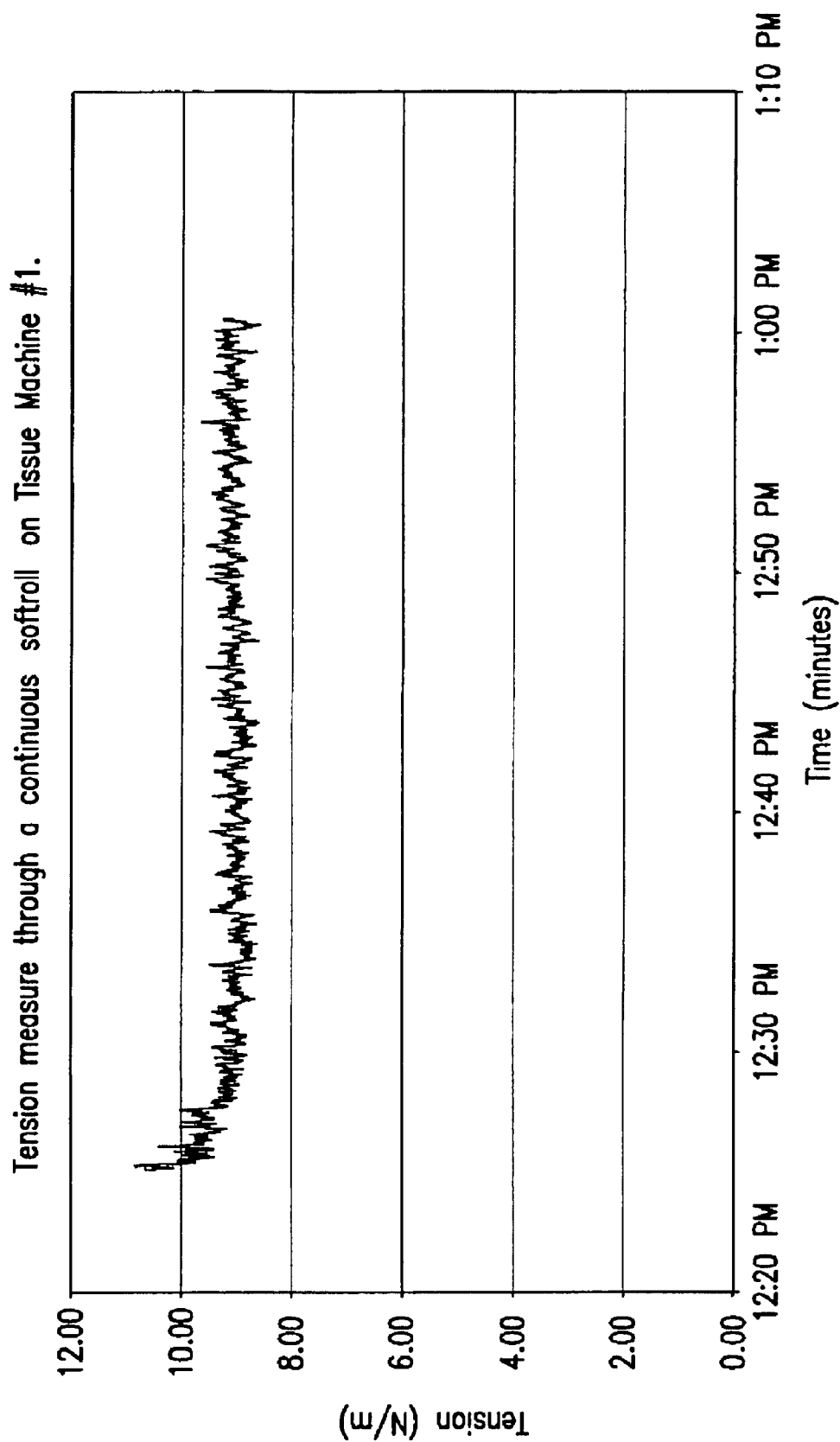
FIG. 13 is a graph of time versus tension for an exemplary embodiment of the present invention.

Tension sensor 74 was used to examine a full softroll to determine whether there were any noticeable trends throughout the roll. A typical softroll takes approximately 30 minutes to run. FIG. 13 shows data obtained through a measurement of the softroll. In the present experiment, before the softroll was started, the roll prior to it had broken on the turn-up. When this occurs, Hercobond was added to help get the web 38 back onto the roll. The addition of Hercobond explains the downward trend in the tension for the first six minutes as the Hercobond was phased out of the system. Throughout the rest of the roll, there were not any dramatic trends. The roll maintained a fairly constant tension at around 9.0 Newtons per metered. FIG. 13 includes a turn-up at the end without using Hercobond.

Figure 14:
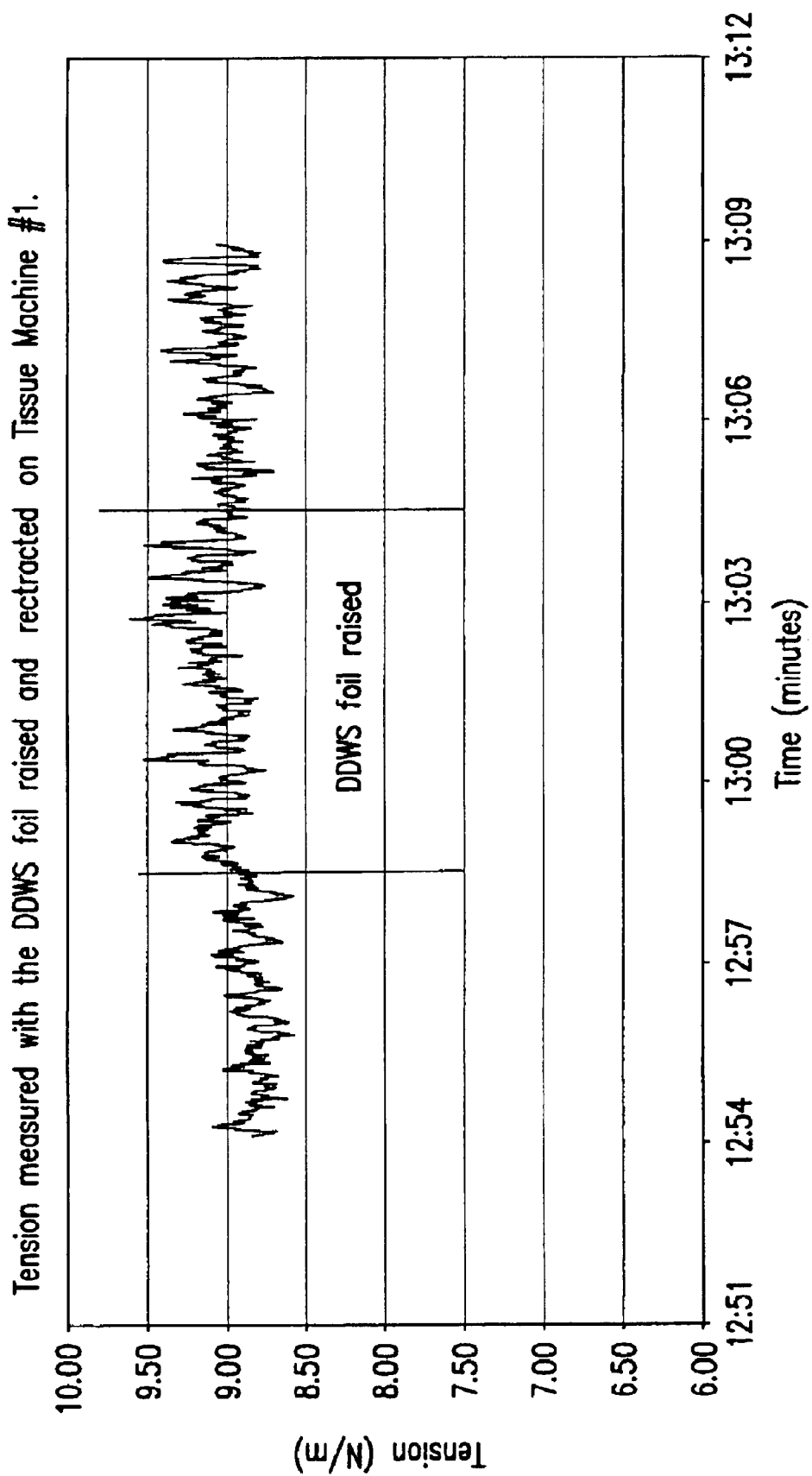
FIG. 14 is a graph of time versus tension for another exemplary embodiment of the present invention.

Another measurement that was conducted involves the installation of a DDWS foil onto the tissue machine. In theory, the foil provides a layer of air onto which the web 38 rides along, therefore stabilizing web 38. Usually, the foil is under the web 38 and is rarely used by the operators since CD and MD stability does not seemingly benefit. The foil was raised for a few minutes to determine whether or not it helped with stability. FIG. 14 shows that the tension was fairly stable at about 8.8 Newtons per meter while the foil was not contacting the sheet. Once the foil was raised, the tension became unstable and higher at about 9.0 Newtons per meter. Presumably, the increase in tension is caused by the foil pressing against the web 38. The variability could possibly be a result of the layer of air not consistently hugging the web 38 onto the foil.

The tension apparatus 74 was able to pick up changes in many process variables as shown in the preceding experiments. Knowledge of changes in the process variables can result in a quicker, more reliable response to successfully controlling the strength in a web 38. Instead of having to wait for lab tests to verify properties, this on-line method can allow for changes during the production of a rolled product. The tension apparatus 74 disclosed in the present invention is therefore capable of being able to read webs 38 that travel at high speeds v and also have low tensions associated therewith without contacting the web 38.

What is claimed is:

1. A process for determining the tension in a moving web, comprising the steps of:
   providing a web moving at a determined speed, the web having a determined basis weight;
   creating a wave in the moving web;
   determining the speed of the propagation of the wave; and
   determining the tension on the moving web through a mathematical relationship between the wave speed, the basis weight of the web, and the speed of the web, wherein the instability index of the web is greater than or equal to 0.5, and is measured by the following equation:

$$\text{instability index} = v/(v+vd) \text{ or } v/(vd-v):$$

wherein:
   v=web speed; and
   vd=wave speed.

2. The process for determining the tension in a moving web of claim 1, wherein the tension of the web is between about 10 Nt/m and about 35 Nt/m, and the speed of the web is about 25 m/s, and the basis weight of the web is about 15 gsm.

3. The process for determining the tension in a moving web of claim 1, wherein the instability index of the web is greater than about 0.8.

4. The process for determining the tension in a moving web of claim 1, wherein the step of creating a wave in the moving web is accomplished by an air pulse on the web.

5. The process for determining the tension in a moving web of claim 4, wherein the step of determining the speed of the propagation of the wave is accomplished by the use of two laser displacement transducers which each provide a signal and are also configured for measuring the speed of the web.

6. A process for determining the tension in a moving web, comprising the steps of:
   providing a web moving at a determined speed, the web having a determined basis weight;
   creating a wave in the moving web;
   determining the speed of the propagation of the wave; and
   determining the tension on the moving web through a mathematical relationship between the wave speed, the basis weight of the web, and the speed of the web, wherein the instability index of the web is greater than or equal to 0.5;
   wherein the step of creating a wave in the moving web is accomplished by an air pulse on the web;
   wherein the step of determining the speed of the propagation of the wave is accomplished by the use of two laser displacement transducers which each provide a signal and are also configured for measuring the speed of the web; and
   wherein the air pulse is controlled by a computer, and the signals from the two laser displacement transducers are controlled and analyzed by the computer.

7. The process for determining the tension in a moving web of claim 6, wherein the signals from the two laser displacement transducers are bandpass filtered, and then differentiated.

8. The process for determining the tension in a moving web of claim 7, wherein the signals are mathematically cross-correlated to determine the time delay between the signals generated by the two laser displacement transducers.

9. A process for controlling a moving web, comprising the steps of:
   providing a web moving at a determined speed, the web having a determined basis weight;
   generating a wave in the moving web;
   measuring the speed of the wave in the web; and
   determining the instability index where the instability index is in a desired range being between about 0.6 and 1.0.

10. The process for controlling a moving web of claim 9, wherein the desired range is between about 0.6 and about 0.9.

11. The process for controlling a moving web of claim 9, wherein the desired range of the instability index is between about 0.8 and 1.0.

12. The process for controlling a moving web of claim 9, wherein the desired range of the instability index is between 0.7 and 1.0.

* * * * *